(12) United States Patent
Jung et al.

(10) Patent No.: US 11,601,860 B2
(45) Date of Patent: *Mar. 7, 2023

(54) RESOURCES CORRESPONDING TO BANDWIDTH PARTS

(71) Applicant: Lenovo (Singapore) Pte. Ltd., New Tech Park (SG)

(72) Inventors: Hyejung Jung, Northbrook, IL (US); Prateek Basu Mallick, Dreieich (DE); Joachim Loehr, Wiesbaden (DE); Vijay Nangia, Woodridge, IL (US); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 148 days.

This patent is subject to a terminal disclaimer.

(21) Appl. No.: 17/227,765

(22) Filed: Apr. 12, 2021

(65) Prior Publication Data

US 2021/0235353 A1    Jul. 29, 2021

Related U.S. Application Data

(63) Continuation of application No. 16/933,115, filed on Jul. 20, 2020, now Pat. No. 10,979,957, which is a
(Continued)

(51) Int. Cl.
*H04W 36/30* (2009.01)
*H04W 36/00* (2009.01)
(Continued)

(52) U.S. Cl.
CPC ......... *H04W 36/305* (2018.08); *H04L 5/0048* (2013.01); *H04L 5/0053* (2013.01);
(Continued)

(58) Field of Classification Search
CPC ......... H04W 36/305; H04W 36/00837; H04W 36/0058; H04W 36/0094; H04W 36/06; H04L 5/0048; H04L 5/0053
(Continued)

(56) References Cited

U.S. PATENT DOCUMENTS

2012/0147755 A1  6/2012  Chen et al.
2012/0281607 A1  11/2012 Lindoff et al.
2018/0367374 A1  12/2018 Liu et al.

FOREIGN PATENT DOCUMENTS

WO    2019/050323 A1    3/2019

OTHER PUBLICATIONS

3GPP, "3rd Generation Partnership Project; Technical Specification Group Radio Access Network; Network; NR; Physical layer procedures for control (Release 15)", 3GPP TS 38.213 V2.0.0, Dec. 2017, pp. 1-56.
(Continued)

*Primary Examiner* — Joel Ajayi
(74) *Attorney, Agent, or Firm* — Kunzler Bean & Adamson

(57) ABSTRACT

Apparatuses, methods, and systems are disclosed for assessing a radio link quality using resources corresponding to bandwidth parts. One method includes receiving first information including a plurality of reference signal resource sets for a plurality of bandwidth parts. Each reference signal resource set of the plurality of reference signal resource sets corresponds to a bandwidth part of the plurality of bandwidth parts. The method includes receiving a plurality of spatial quasi-co-location information corresponding to a plurality of reference signal resources of the plurality of reference signal resource sets. The method includes assessing a radio link quality based on the plurality of spatial quasi-co-location information.

16 Claims, 6 Drawing Sheets

Related U.S. Application Data continuation of application No. 16/278,613, filed on Feb. 18, 2019, now Pat. No. 10,728,825.

(60) Provisional application No. 62/631,627, filed on Feb. 16, 2018.

(51) Int. Cl.
*H04W 36/06* (2009.01)
*H04L 5/00* (2006.01)
*H04L 1/00* (2006.01)

(52) U.S. Cl.
CPC .......... *H04W 36/0058* (2018.08); *H04W 36/0094* (2013.01); *H04W 36/00837* (2018.08); *H04W 36/06* (2013.01); *H04L 1/00* (2013.01); *H04L 5/001* (2013.01); *H04L 5/0057* (2013.01)

(58) Field of Classification Search
USPC ........................................................ 455/437
See application file for complete search history.

(56) References Cited

OTHER PUBLICATIONS

3GPP, 3rd Generation Partnership Project; Technical Specification Group Radio Access Network; NR; Requirements for support of radio resource management (Release 15), 3GPP TS 38.133 V1.0.0, Dec. 2017, pp. 1-39.

3GPP, "3rd Generation Partnership Project; Technical Specification Group Radio Access Network; NR; Physical layer procedures for control (Release 15)", 3GPP TS 38.213 V1.3.0, Dec. 2017, pp. 1-58.

Oppo, "Remaining details on NR RLM", 3GPP TSG RAN WG1 Meeting #92 R1-1802138, Feb. 26-Mar. 2, 2018, pp. 1-3.

Motorola Mobility, Lenovo, "Remaining details on radio link monitoring", 3GPP TSG RAN WG1 Meeting #92 R1-1802677, Feb. 26-Mar. 2, 2018, pp. 1-4.

RESOURCES CORRESPONDING TO BANDWIDTH PARTS

CROSS-REFERENCE TO RELATED APPLICATIONS

This application is a continuation application of U.S. patent application Ser. No. 16/933,115, filed on Jul. 20, 2020, which is a continuation application of U.S. patent application Ser. No. 16/278,613, filed on Feb. 18, 2019, now U.S. Pat. No. 10,728,825, issued on Jul. 28, 2020, which claims priority to U.S. Patent Application Ser. No. 62/631,627 entitled "RADIO LINK MONITORING AND LINK RECONFIGURATION WITH BANDWIDTH PART OPERATION" and filed on Feb. 16, 2018 for Hyejung Jung, all of which are incorporated herein by reference in their entirety.

FIELD

The subject matter disclosed herein relates generally to wireless communications and more particularly relates to resources corresponding to bandwidth parts.

BACKGROUND

The following abbreviations are herewith defined, at least some of which are referred to within the following description: Third Generation Partnership Project ("3GPP"), $5^{th}$ Generation ("5G"), Positive-Acknowledgment ("ACK"), Aggregation Level ("AL"), Access and Mobility Management Function ("AMF"), Access Point ("AP"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSP"), Channel State Information-Reference Signal ("CSI-RS"), Common Search Space ("CSS"), Control Resource Set ("CORE-SET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), Primary Cell ("PCell"), Policy Control Function (""PCF"), Physical Cell ID ("POD"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Resource Element Group ("REG"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), Visiting AMF ("vAMF"), Visiting NSSF ("vNSSF"), Visiting PLMN ("VPLMN"), and Worldwide Interoperability for Microwave Access ("WiMAX").

In certain wireless communications networks, bandwidth parts may be used. In such networks, a device may not know what resources corresponding to bandwidth parts.

BRIEF SUMMARY

Methods for assessing a radio link quality using resources corresponding to bandwidth parts are disclosed. Apparatuses and systems also perform the functions of the apparatus. One embodiment of a method includes receiving first information including a plurality of reference signal resource sets for a plurality of bandwidth parts. In such an embodiment, each reference signal resource set of the plurality of reference signal resource sets corresponds to a bandwidth part of the plurality of bandwidth parts. In certain embodiments, the method includes receiving a plurality of spatial quasi-co-location information corresponding to a plurality of reference signal resources of the plurality of reference signal resource sets. In various embodiments, the method includes assessing a radio link quality based on the plurality of spatial quasi-co-location information.

One apparatus for assessing a radio link quality using resources corresponding to bandwidth parts includes a receiver that: receives first information including a plurality of reference signal resource sets for a plurality of bandwidth parts, wherein each reference signal resource set of the plurality of reference signal resource sets corresponds to a bandwidth part of the plurality of bandwidth parts; and receives a plurality of spatial quasi-co-location information corresponding to a plurality of reference signal resources of the plurality of reference signal resource sets. In some embodiments, the apparatus includes a processor that assesses a radio link quality based on the plurality of spatial quasi-co-location information.

One method for transmitting information related to resources corresponding to bandwidth parts includes transmitting first information including a plurality of reference signal resource sets for a plurality of bandwidth parts. In such an embodiment, each reference signal resource set of the plurality of reference signal resource sets corresponds to a bandwidth part of the plurality of bandwidth parts. In various embodiments, the method includes transmitting a plurality of spatial quasi-co-location information corresponding to a plurality of reference signal resources of the plurality of reference signal resource sets. In such embodiments, a radio link quality is assessed based on the plurality of spatial quasi-co-location information.

One apparatus for transmitting information related to resources corresponding to bandwidth parts includes a transmitter that: transmits first information including a plurality of reference signal resource sets for a plurality of bandwidth parts, wherein each reference signal resource set of the plurality of reference signal resource sets corresponds to a bandwidth part of the plurality of bandwidth parts; and transmits a plurality of spatial quasi-co-location information corresponding to a plurality of reference signal resources of the plurality of reference signal resource sets, wherein a radio link quality is assessed based on the plurality of spatial quasi-co-location information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
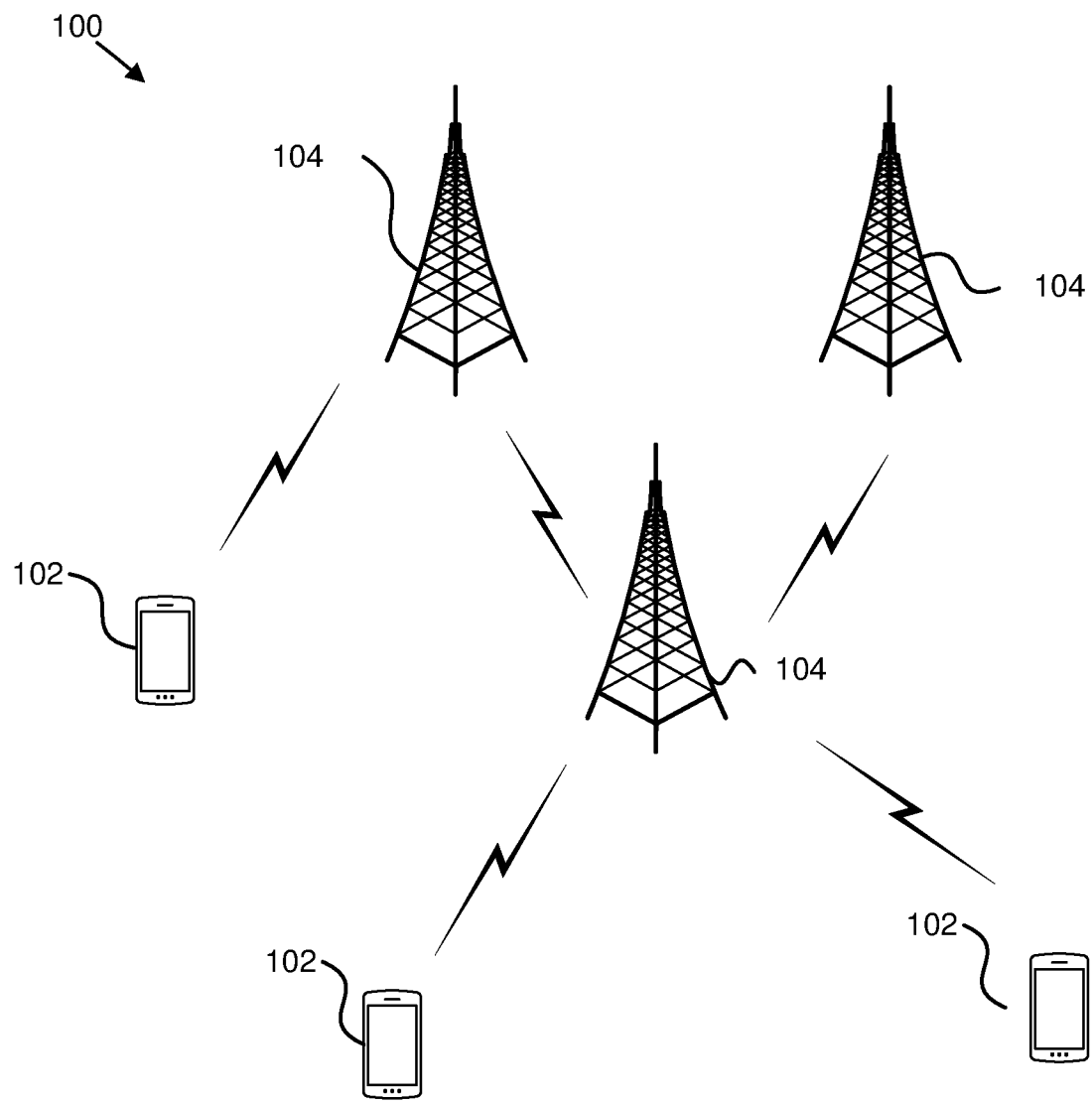
FIG. 1 is a schematic block diagram illustrating one embodiment of a wireless communication system for assessing a radio link quality using resources corresponding to bandwidth parts.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for assessing a radio link quality using resources corresponding to bandwidth parts. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive first information including a plurality of reference signal resource sets for a plurality of bandwidth parts. In such an embodiment, each reference signal resource set of the plurality of reference signal resource sets corresponds to a bandwidth part of the plurality of bandwidth parts. In certain embodiments, the remote unit 102 may receive a plurality of spatial quasi-co-location information corresponding to a plurality of reference signal resources of the plurality of reference signal resource sets. In various embodiments, the remote unit 102 may assess a radio link quality based on the plurality of spatial quasi-co-location information. Accordingly, the remote unit 102 may be used for assessing a radio link quality using resources corresponding to bandwidth parts.

In certain embodiments, a network unit 104 may transmit first information including a plurality of reference signal resource sets for a plurality of bandwidth parts. In such an embodiment, each reference signal resource set of the plurality of reference signal resource sets corresponds to a bandwidth part of the plurality of bandwidth parts. In various embodiments, the network unit 104 may transmit a plurality of spatial quasi-co-location information corresponding to a plurality of reference signal resources of the plurality of reference signal resource sets. In such embodiments, a radio link quality is assessed based on the plurality of spatial quasi-co-location information. Accordingly, the network unit 104 may be used for transmitting information related to resources corresponding to bandwidth parts.

Figure 2:
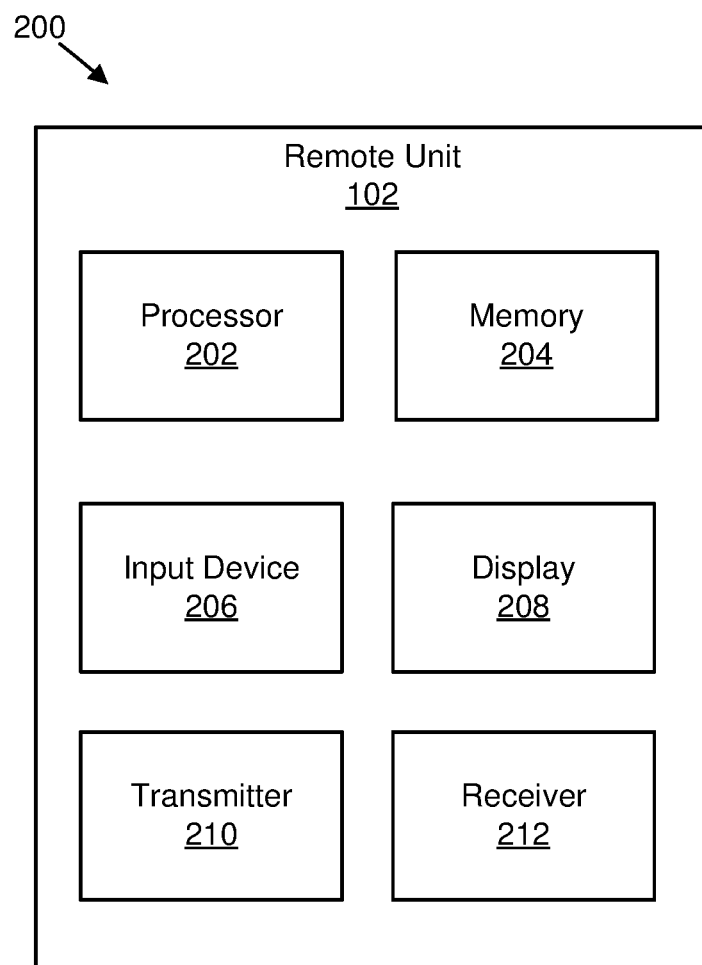
FIG. 2 is a schematic block diagram illustrating one embodiment of an apparatus that may be used for assessing a radio link quality using resources corresponding to bandwidth parts.

FIG. 2 depicts one embodiment of an apparatus 200 that may be used for assessing a radio link quality using resources corresponding to bandwidth parts. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may assess a radio link quality based on a plurality of spatial quasi-co-location information. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212: receives first information including a plurality of reference signal resource sets for a plurality of bandwidth parts, wherein each reference signal resource set of the plurality of reference signal resource sets corresponds to a bandwidth part of the plurality of bandwidth parts; and receives a plurality of spatial quasi-co-location information corresponding to a plurality of reference signal resources of the plurality of reference signal resource sets.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
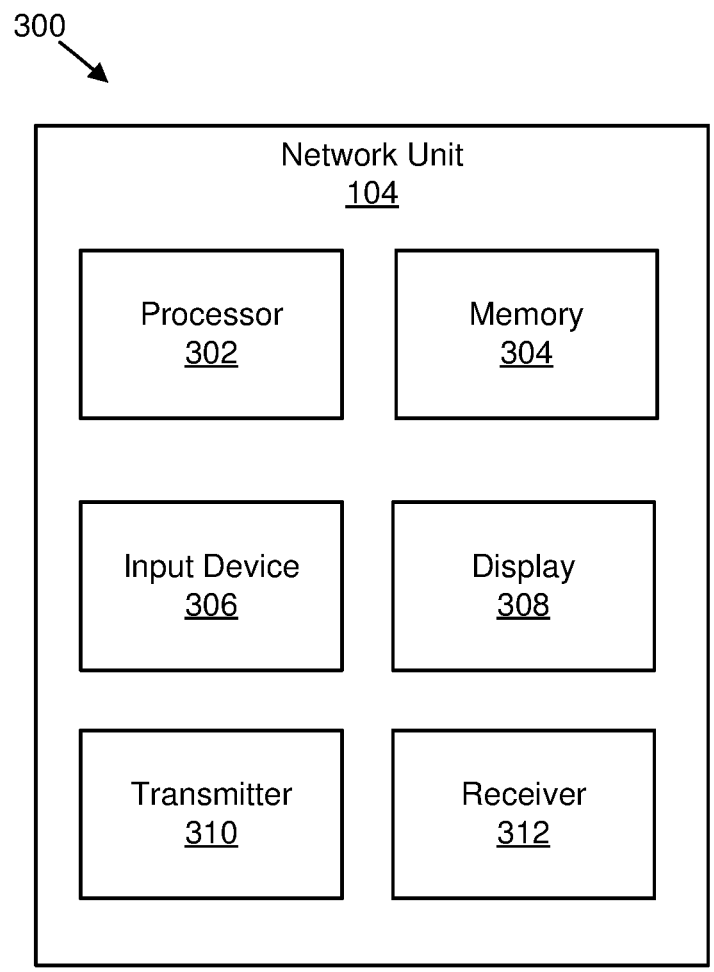
FIG. 3 is a schematic block diagram illustrating one embodiment of an apparatus that may be used for transmitting information related to resources corresponding to bandwidth parts.

FIG. 3 depicts one embodiment of an apparatus 300 that may be used for transmitting information related to resources corresponding to bandwidth parts. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310: transmits first information including a plurality of reference signal resource sets for a plurality of bandwidth parts, wherein each reference signal resource set of the plurality of reference signal resource sets corresponds to a bandwidth part of the plurality of bandwidth parts; and transmits a plurality of spatial quasi-co-location information corresponding to a plurality of reference signal resources of the plurality of reference signal resource sets, wherein a radio link quality is assessed based on the plurality of spatial quasi-co-location information.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

As used herein, a BWP may include a group of contiguous PRBs (e.g., used in 3GPP NR), and/or may support reduced UE BW capability, UE BW adaptation, frequency division multiplexing of multiple numerologies, and/or use of non-contiguous spectrum. Moreover, as used herein, a connected mode UE may be UE-specifically and/or semi-statically configured with a single or multiple active BWPs for a single carrier. In some embodiments, a BW of a BWP is less than or equal to a maximum UE BW capability, but the BW may be at least as large as a BW of a SS and/or PBCH block (e.g., SS/PBCH block). In such embodiments, the SS/PBCH block includes primary SSs, secondary SSs, and/or PBCH. In certain embodiments, different UEs' BWPs may fully or partially overlap, and it may be up to a network entity (e.g., gNB) to coordinate scheduling of different UEs' BWPs. In various embodiments, configuration parameters of a BWP may include a numerology (e.g., subcarrier spacing), a frequency location (e.g., a starting PRB index based on common PRB indexing), and/or a bandwidth (e.g., number of PRBs). In some embodiments, a given BWP may or may not contain an SS/PBCH block.

In certain embodiments, at a given SS/PBCH block transmission instance, multiple SS/PBCH blocks may be transmitted by a network entity within a BW of a carrier. In various embodiments, from a UE perspective, a cell may be associated with a single SS/PBCH block in a frequency domain, and a cell-defining SS/PBCH block may have one or more associated essential SIBS (e.g., SIB1 and/or SIB2) that may include RMSI (e.g., system information not included in a MIB but essential to accessing a cell). In some embodiments, multiple cell-defining SS/PBCH blocks associated with a common NE and transmitted on different SS raster frequencies within the carrier may or may not have common system information. In such embodiments, a spatial coverage (e.g., spatial coverage of multiple cell-defining SS/PBCH blocks in a frequency) of the SS/PBCH blocks may or may not be the same.

Described herein are various methods used to perform radio link monitoring and link reconfiguration with BWP operation within a wideband carrier. In such methods, the wideband carrier may refer to a carrier that includes one or more cell-defining SS/PBCH blocks associated with a common network entity (e.g., a base station).

In some embodiments, a UE may be configured with single antenna port CSI-RS and/or SS/PBCH blocks as RLM-RSs, and resources for interference and noise measurement for RLM may be left up to UE implementation. In certain embodiments, depending on operating frequency bands, up to 2 (e.g., for up to a 3 GHz frequency band), 4 (e.g., for between 3 GHz and 6 GHz frequency bands), or 8 (e.g., for above 6 GHz frequency bands) RLM-RS resources per BWP may be configured in a cell in which a UE performs RLM (e.g., PCell, PSCell, SpCell) for the UE.

In various embodiments, a physical layer in a UE may assess (e.g., once per an indication period) a radio link quality evaluated over a previous time period (e.g., that may be defined according to TS 38.133) against thresholds (e.g., $Q_{out}$ and $Q_{in}$). In such embodiments, the UE determines the indication period as a maximum between a shortest periodicity for radio link monitoring resources and 10 msec. In certain embodiments, in a DRX mode, an indication period may be determined as a maximum between a shortest periodicity for radio link monitoring resources and a DRX period. In some embodiments, a physical layer in a UE may, in frames in which a radio link quality is assessed, indicate out-of-sync to higher layers if the radio link quality is worse than a threshold $Q_{out}$ for all resources in a RLM resource set. In various embodiments, if a radio link quality is better than a threshold $Q_{in}$ for any resource in a set of resources for radio link monitoring, a physical layer in a UE may, in frames in which the radio link quality is assessed, indicate in-sync to higher layers.

In one embodiment, a UE may receive an indication on a plurality of RLM-RS resource sets for a plurality of configured BWPs in a RLM cell. In such an embodiment, each of the plurality of RLM-RS resource sets may be configured for one or more BWPs of the plurality of configured BWPs. In certain embodiments, a UE may receive information indicating spatial QCL information among RLM-RS resources of different RLM-RS resource sets and the UE may evaluate a radio link quality based on the information indicating the spatial QCL information. In various embodiments, if a UE receives a command for active BWP switching and switches an active BWP from a first BWP to a second BWP and if a first RLM-RS resource of a first RLM-RS resource set for the first BWP is indicated to be spatially QCL with a second RLM-RS resource of a second RLM-RS resource set for the second BWP, the UE may evaluate the radio link quality on the second RLM-RS resource over a previous time period taking into account measurements made for the first RLM-RS resource (e.g., because they are QCL). As may be appreciated, using a QCL relationship between first and second RLM-RS resources may be beneficial to obtain more accurate and/or long-term averaged radio link quality estimates even if a UE frequently switches from one BWP to another BWP.

In one embodiment, all configured RLM-RS resource sets for configured BWPs may be associated with a common set of DL transmit beams and, accordingly, a UE may receive an indication relating to spatial QCL for each RLM-RS resource of each RLM-RS resource set. In such an embodiment, the UE may perform a radio link quality evaluation on a given RLM-RS resource of at least one current active BWP by taking into account measurements on QCL RLM-RS resources of other configured BWPs. In another embodiment, a part of RLM-RS resources from a part of RLM-RS resource sets may have a spatial QCL relationship. In such an embodiment, a UE may perform weighted averaging and/or filtering over the part of RLM-RS resources for radio link quality evaluation. In other embodiments, a RLM-RS resource set configured in a default BWP of a UE may include RLM-RS resources associated with all serving control channels of a RLM cell, the UE may periodically retune to a default BWP, and the UE may perform radio link monitoring on the default BWP. In such an embodiment, the default BWP is a BWP that the UE is supposed to switch to if a BWP inactivity timer expires in a given active BWP. As may be appreciated, periodic RLM for all configured serving control channel beams (e.g., across configured BWPs) in a default BWP may inhibit a radio link failure procedure being initiated due to failure of a subset of beams in a certain BWP in which a UE stays for a long time.

In certain embodiments, a physical layer in a UE may, in frames in which radio link quality is assessed, indicate out-of-sync to higher layers if the radio link quality is less than a threshold $Q_{out}$ for all RLM resources in at least one RLM resource set for at least one current active BWP. In such embodiments, if the radio link quality is greater than a threshold $Q_{in}$ for any RLM resource in the at least one RLM resource set for the at least one current active BWP, the physical layer in the UE may, in frames in which the radio link quality is assessed, indicate in-sync to higher layers.

In various embodiments, a UE may maintain one IS counter and one OOS counter per RLM cell for a radio link failure related procedure. In such embodiments, the UE counts IS and/or OOS instances across configured BWPs. As may be appreciated, IS and/or OOS decisions at a given instance may be made based on at least one RLM resource set for at least one current active BWP.

In some embodiments, if different serving beams are used and/or configured in different configured BWPs and link quality (e.g., serving beam quality) of a current active BWP degrades, a UE may inform a network entity of link quality degradation via a periodic layer 1 (e.g., L1) RSRP reporting (and/or L1-RSRP reporting may be triggered) and the UE may receive a command to switch to a different BWP configured with different serving beams. In such embodiments, because the UE is operated with serving beams configured for a current active BWP at a given time, RLM IS or OOS status may be assessed based on the RLM resource set for the current active BWP.

Figure 4:
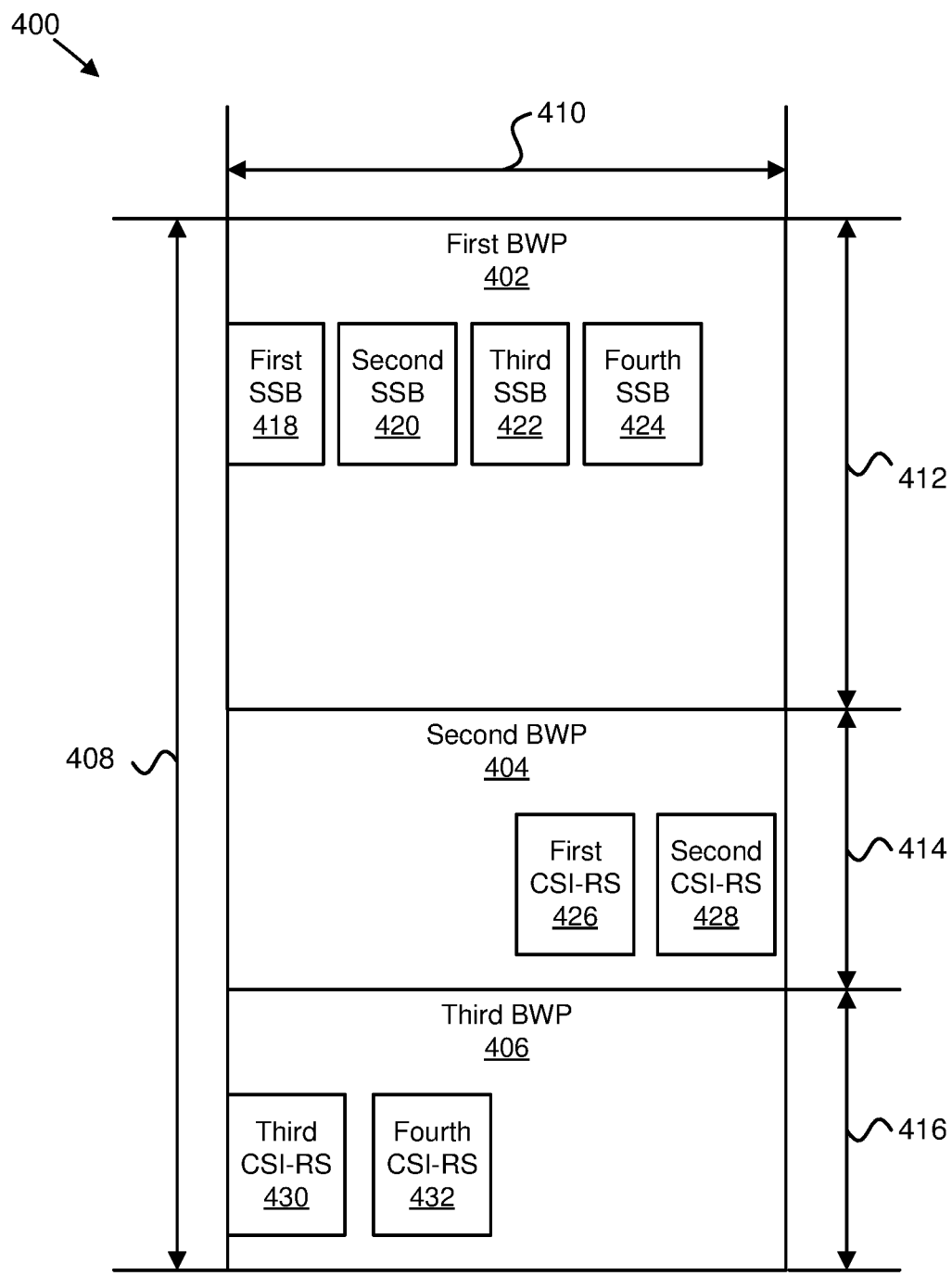
FIG. 4 is a schematic block diagram illustrating one embodiment of a system having different BWP configurations.

FIG. 4 is a schematic block diagram illustrating one embodiment of a system 400 having different BWP configurations. The system 400 (e.g., a UE, the remote unit 102) is configured with a first BWP 402, a second BWP 404, and a third BWP 406 in a cell. Moreover, RLM resources may be configured for each BWP. The first BWP 402, the second BWP 404, and the third BWP 406 are within a carrier bandwidth 408 and extend over a time 410. Moreover, the first BWP 402 has a first bandwidth 412, the second BWP 404 has a second bandwidth 414, and the third BWP 406 has a third bandwidth 416.

The network unit 104 (e.g., gNB) transmits a first SSB 418, a second SSB 420, a third SSB 422, and a fourth SSB 424. Each of the SSBs may be SS/PBCH blocks transmitted within a 5 ms time window, and the first SSB 418, the second SSB 420, the third SSB 422, and the fourth SSB 424 are configured as RLM resources for the first BWP 402. The first BWP 402 may be configured as a default BWP. As may be appreciated, the system 400 may periodically switch to the default BWP and performs radio link monitoring on the default BWP. The network unit 104 transmits a first CSI-RS 426, a second CSI-RS 428, a third CSI-RS 430, and a fourth CSI-RS 432. The first CSI-RS 426 is QCL with the first SSB 418, the second CSI-RS 428 is QCL with the second SSB 420, the third CSI-RS 430 is QCL with the third SSB 422, and the fourth CSI-RS 432 is QCL with the fourth SSB 424. Furthermore, the first CSI-RS 426 and the second CSI-RS 428 are configured as RLM resources for the second BWP 404, and the third CSI-RS 430 and the fourth CSI-RS 432 are configured as RLM resources for the third BWP 406. Moreover, the system 400 may use a QCL relationship between the SSBs and CSI-RSs for evaluation of radio link quality (e.g., including determining in-sync or out-of-sync).

In some embodiments, such as in multi-beam based wireless network operations, a UE may perform radio link quality measurements on periodic CSI-RS and/or SS/PBCH blocks. In such embodiments, for each configured BWP, the UE may be configured with a set $\overline{q}_0$ of periodic CSI-RS resource configuration indexes by a higher layer parameter Beam-Failure-Detection-RS-ResourceConfig and with a set $q_1$ of CSI-RS resource configuration indexes and/or SS/PBCH block indexes by a higher layer parameter Candidate-Beam-RS-List.

In certain embodiments, a physical layer in a UE may, in slots in which a radio link quality according to a set $\overline{q}_0$ is assessed, provide an indication to higher layers if the radio link quality for all corresponding resource configurations in the set $\overline{q}_0$ that the UE uses to assess the radio link quality is less than a threshold $Q_{out,LR}$ (e.g., indicating beam failure). In such embodiments, the physical layer may inform the higher layers if the radio link quality is less than the threshold $Q_{out,LR}$ within an assessment periodicity determined by a maximum between a shortest periodicity of periodic CSI-RS configurations or SS/PBCH blocks in the set $q_0$ and a predetermined time duration.

In various embodiments, if potentially different serving beams are used and/or configured in different configured BWPs and a UE detects beam failure for all current active BWPs, there may be various UE behaviors such as found in the following first and second embodiments.

In the first embodiment, a UE may identify at least one suitable beam (e.g., based on L1-RSRP measurements) from at least one candidate beam set of at least one current active BWP (e.g., determine $q_{new}$—an index of CSI-RS configuration or SS/PBCH block—from a set $q_1$). In such an embodiment, the UE may perform PRACH transmissions for a beam failure recovery request and may monitor a control resource set for a beam failure recovery response in a first BWP. Moreover, in such an embodiment, the first BWP includes configured beam failure recovery request RACH resources and a configured control resource set for the beam failure recovery response for the newly identified suitable beam $q_{new}$.

In the second embodiment, the UE may not be able to identify any suitable beam from at least one candidate beam set of at least one current active BWP. In such an embodiment, the UE may switch to a default DL BWP and may search for a new suitable beam from a candidate beam set of a default DL BWP. Moreover, in such an embodiment, the default DL BWP may or may not be the same as an initial active DL BWP.

In some embodiments, a UE receives an indication on a plurality of BFD resource sets for a plurality of configured BWPs in a serving cell. In such embodiments, each of the plurality of BFD resource sets may be configured to correspond to one or more of the plurality of configured BWPs. In certain embodiments, a UE receives an indication that indicates spatial QCL information among BFD resources of different BFD resource sets and evaluates the radio link quality based on the indicated spatial QCL information. In various embodiments, if a UE receives a command for active BWP switching and switches an active BWP from a first BWP to a second BWP, and if a first BFD resource of a first BFD resource set for the first BWP is indicated to be spatially QCL with a second BFD resource of a second BFD resource set for the second BWP, a UE may evaluate a physical layer radio link quality on the second BFD resource taking into account a measurement made on the first BFD resource. As may be appreciated, by using a QCL relationship between first and second BFD resources, more accurate and/or consistent radio link quality estimates may be obtained even if the UE frequently switches from one BWP to another BWP.

In some embodiments, a physical layer in a UE may, in slots in which a radio link quality according to at least one BFD resource set of at least one current active BWP is assessed, provide an indication to higher layers if the radio link quality for all corresponding BFD resources in the at least one BFD resource set of the at least one current active BWP is less than a threshold $Q_{out,LR}$.

Figure 5:
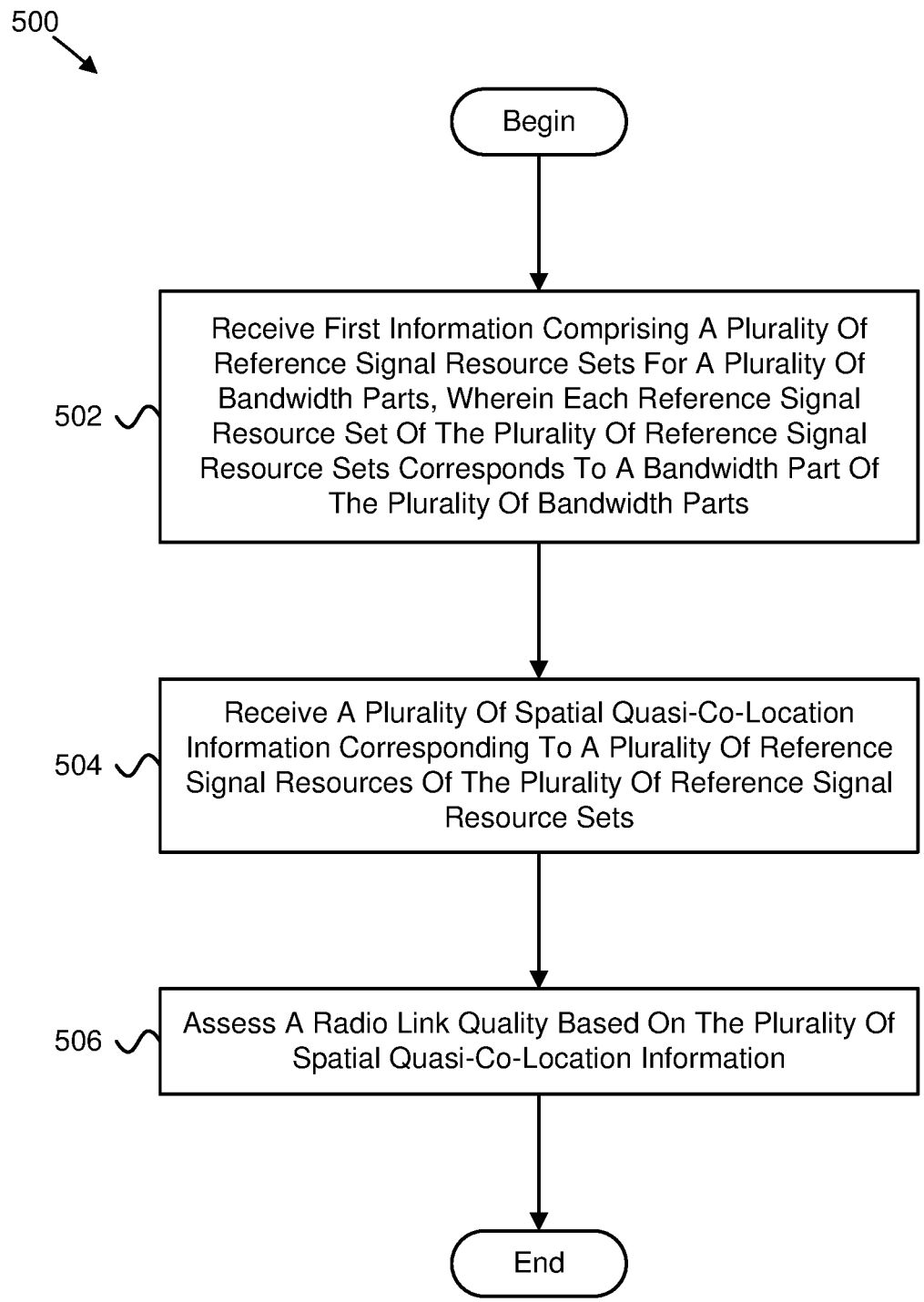
FIG. 5 is a flow chart diagram illustrating one embodiment of a method for assessing a radio link quality using resources corresponding to bandwidth parts.

FIG. 5 is a flow chart diagram illustrating one embodiment of a method 500 for assessing a radio link quality using resources corresponding to bandwidth parts. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502 first information including a plurality of reference signal resource sets for a plurality of bandwidth parts. In such an embodiment, each reference signal resource set of the plurality of reference signal resource sets corresponds to a bandwidth part of the plurality of bandwidth parts. In certain embodiments, the method 500 includes receiving 504 a plurality of spatial quasi-co-location information corresponding to a plurality of reference signal resources of the plurality of reference signal resource sets. In various embodiments, the method 500 includes assessing 506 a radio link quality based on the plurality of spatial quasi-co-location information.

In certain embodiments, each reference signal resource set of the plurality of reference signal resource sets comprises a synchronization signal/physical broadcast channel block, a channel state information reference signal, or some combination thereof. In some embodiments, the radio link quality is assessed each time period of a plurality of time periods. In various embodiments, the method 500 further comprises, for a radio link quality assessment of a time period of the plurality of time periods, evaluating measurements over a predefined number of previous time periods with respect to the time period.

In one embodiment, the method 500 further comprises receiving a time window configuration for a time window of radio link monitoring, wherein the time window of radio link monitoring comprises at least one time period of the plurality of time periods and the time window configuration comprises a time window offset, a time window duration, a time window periodicity, or some combination thereof. In certain embodiments, the plurality of reference signal resource sets comprises a plurality of radio link monitoring reference signal resource sets.

In some embodiments, the method 500 further comprises indicating, via a physical layer in a user equipment, an out-of-sync indication to higher layers in the user equipment if the radio link quality is below a first quality threshold for all radio link monitoring reference signal resources in a radio link monitoring reference signal resource set of the plurality of radio link monitoring reference signal resource sets for an active bandwidth part of the plurality of bandwidth parts.

In various embodiments, the method 500 further comprises indicating, via a physical layer in a user equipment, an in-sync indication to higher layers in the user equipment if the radio link quality is above a second quality threshold for any radio link monitoring reference signal resource in a radio link monitoring reference signal resource set of the plurality of radio link monitoring reference signal resource sets for an active bandwidth part of the plurality of bandwidth parts.

In one embodiment, the method 500 further comprises counting a number of in-sync instances and a number of out-of-sync instances that occur in the plurality of bandwidth parts, wherein the number of in-sync instances and the number of out-of-sync instances are used for determining a radio link failure.

In certain embodiments, the method 500 further comprises: receiving second information comprising a plurality of candidate beam resource sets for the plurality of bandwidth parts, wherein: each candidate beam resource set of the plurality of candidate beam resource sets corresponds to a bandwidth part of the plurality of bandwidth parts; the plurality of reference signal resource sets comprises a plurality of beam failure detection reference signal resource sets; and assessing the radio link quality is based on a beam failure detection reference signal resource set of the plurality of beam failure detection reference signal resources sets corresponding to an active bandwidth part of the plurality of bandwidth parts; detecting a beam failure based on the radio link quality; selecting a new beam in response to detecting the beam failure; selecting a candidate beam resource of the plurality of candidate beam resource sets corresponding to the new beam; performing a physical random access channel transmission on a beam failure recovery request random access channel resource associated with the candidate beam resource; and monitoring a control resource set for a beam failure recovery response in a first bandwidth part of the plurality of bandwidth parts, wherein the first bandwidth part includes the control resource set for the beam failure recovery response, and the control resource set is associated with the beam failure recovery request random access channel resource associated with the candidate beam resource.

In some embodiments, beam failure is indicated to higher layers if the radio link quality for all corresponding beam failure detection reference signal resources in the beam failure detection reference signal resource set of the active bandwidth part is less than a third quality threshold. In various embodiments, the candidate beam resource is from a candidate beam resource set of the plurality of candidate beam resource sets corresponding to an active bandwidth part. In one embodiment, the first bandwidth part is a default bandwidth part, and a user equipment switches to the default bandwidth part if a bandwidth part inactivity timer expires for an active bandwidth part. In certain embodiments, the first bandwidth part is an initial active downlink bandwidth part.

Figure 6:
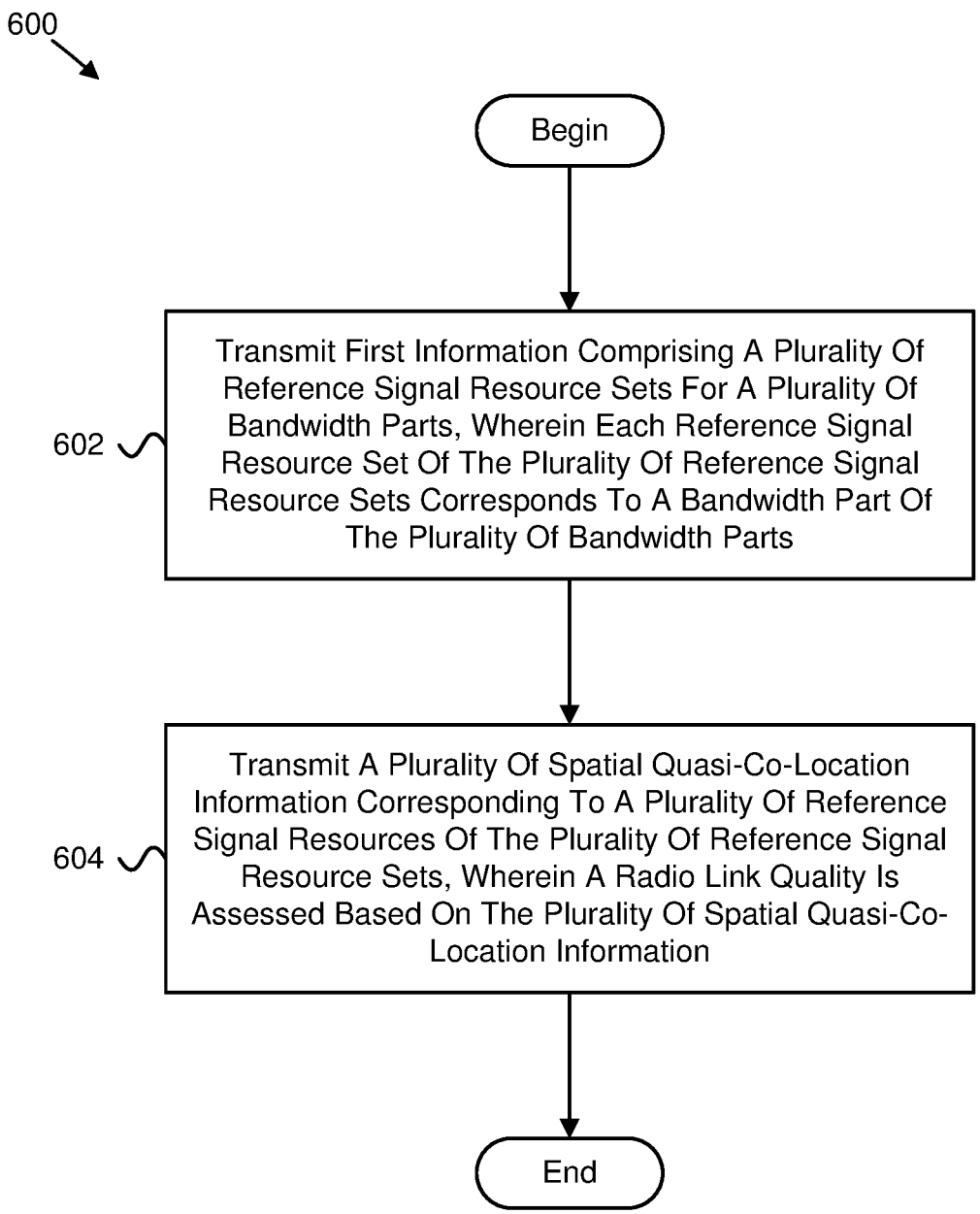
FIG. 6 is a flow chart diagram illustrating one embodiment of a method for transmitting information related to resources corresponding to bandwidth parts.

FIG. 6 is a flow chart diagram illustrating one embodiment of a method 600 for transmitting information related to resources corresponding to bandwidth parts. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 first information including a plurality of reference signal resource sets for a plurality of bandwidth parts. In such an embodiment, each reference signal resource set of the plurality of reference signal resource sets corresponds to a bandwidth part of the plurality of bandwidth parts. In various embodiments, the method 600 includes transmitting 604 a plurality of spatial quasi-co-location information corresponding to a plurality of reference signal resources of the plurality of reference signal resource sets. In such embodiments, a radio link quality is assessed based on the plurality of spatial quasi-co-location information.

In certain embodiments, each reference signal resource set of the plurality of reference signal resource sets comprises a synchronization signal/physical broadcast channel block, a channel state information reference signal, or some combination thereof. In some embodiments, the radio link quality is assessed each time period of a plurality of time periods. In various embodiments, for a radio link quality assessment of a time period of the plurality of time periods, measurements over a predefined number of previous time periods are evaluated with respect to the time period.

In one embodiment, the method 600 further comprises transmitting a time window configuration for a time window of radio link monitoring, wherein the time window of radio link monitoring comprises at least one time period of the plurality of time periods and the time window configuration comprises a time window offset, a time window duration, a time window periodicity, or some combination thereof. In certain embodiments, the plurality of reference signal resource sets comprises a plurality of radio link monitoring reference signal resource sets.

In some embodiments, the method 600 further comprises: transmitting second information comprising a plurality of candidate beam resource sets for the plurality of bandwidth parts, wherein: each candidate beam resource set of the plurality of candidate beam resource sets corresponds to a bandwidth part of the plurality of bandwidth parts; the plurality of reference signal resource sets comprises a plurality of beam failure detection reference signal resource sets; and the radio link quality is assessed based on a beam failure detection reference signal resource set of the plurality of beam failure detection reference signal resources sets corresponding to an active bandwidth part of the plurality of bandwidth parts; a beam failure is detected based on the radio link quality; a new beam is selected in response to detecting the beam failure; a candidate beam resource of the plurality of candidate beam resource sets corresponding to the new beam is selected; a physical random access channel transmission is performed on a beam failure recovery request random access channel resource associated with the candidate beam resource; and a control resource set for a beam failure recovery response in a first bandwidth part of the plurality of bandwidth parts is monitored, wherein the first bandwidth part includes the control resource set for the beam failure recovery response, and the control resource set is associated with the beam failure recovery request random access channel resource associated with the candidate beam resource.

In various embodiments, the candidate beam resource is from a candidate beam resource set of the plurality of candidate beam resource sets corresponding to an active bandwidth part. In one embodiment, the first bandwidth part is a default bandwidth part, and a user equipment switches to the default bandwidth part if a bandwidth part inactivity timer expires for an active bandwidth part. In certain embodiments, the first bandwidth part is an initial active downlink bandwidth part.

In one embodiment, a method comprises: receiving first information comprising a plurality of reference signal resource sets for a plurality of bandwidth parts, wherein each reference signal resource set of the plurality of reference signal resource sets corresponds to a bandwidth part of the plurality of bandwidth parts; receiving a plurality of spatial quasi-co-location information corresponding to a plurality of reference signal resources of the plurality of reference signal resource sets; and assessing a radio link quality based on the plurality of spatial quasi-co-location information.

In certain embodiments, each reference signal resource set of the plurality of reference signal resource sets comprises a synchronization signal/physical broadcast channel block, a channel state information reference signal, or some combination thereof.

In some embodiments, the radio link quality is assessed each time period of a plurality of time periods.

In various embodiments, the method further comprises, for a radio link quality assessment of a time period of the plurality of time periods, evaluating measurements over a predefined number of previous time periods with respect to the time period.

In one embodiment, the method further comprises receiving a time window configuration for a time window of radio link monitoring, wherein the time window of radio link monitoring comprises at least one time period of the plurality of time periods and the time window configuration comprises a time window offset, a time window duration, a time window periodicity, or some combination thereof.

In certain embodiments, the plurality of reference signal resource sets comprises a plurality of radio link monitoring reference signal resource sets.

In some embodiments, the method further comprises indicating, via a physical layer in a user equipment, an out-of-sync indication to higher layers in the user equipment if the radio link quality is below a first quality threshold for all radio link monitoring reference signal resources in a radio link monitoring reference signal resource set of the plurality of radio link monitoring reference signal resource sets for an active bandwidth part of the plurality of bandwidth parts.

In various embodiments, the method further comprises indicating, via a physical layer in a user equipment, an in-sync indication to higher layers in the user equipment if the radio link quality is above a second quality threshold for any radio link monitoring reference signal resource in a radio link monitoring reference signal resource set of the plurality of radio link monitoring reference signal resource sets for an active bandwidth part of the plurality of bandwidth parts.

In one embodiment, the method further comprises counting a number of in-sync instances and a number of out-of-sync instances that occur in the plurality of bandwidth parts, wherein the number of in-sync instances and the number of out-of-sync instances are used for determining a radio link failure.

In certain embodiments, the method further comprises: receiving second information comprising a plurality of candidate beam resource sets for the plurality of bandwidth parts, wherein: each candidate beam resource set of the plurality of candidate beam resource sets corresponds to a bandwidth part of the plurality of bandwidth parts; the plurality of reference signal resource sets comprises a plurality of beam failure detection reference signal resource sets; and assessing the radio link quality is based on a beam failure detection reference signal resource set of the plurality of beam failure detection reference signal resources sets corresponding to an active bandwidth part of the plurality of bandwidth parts; detecting a beam failure based on the radio link quality; selecting a new beam in response to detecting the beam failure; selecting a candidate beam resource of the plurality of candidate beam resource sets corresponding to the new beam; performing a physical random access channel transmission on a beam failure recovery request random access channel resource associated with the candidate beam resource; and monitoring a control resource set for a beam failure recovery response in a first bandwidth part of the plurality of bandwidth parts, wherein the first bandwidth part includes the control resource set for the beam failure recovery response, and the control resource set is associated with the beam failure recovery request random access channel resource associated with the candidate beam resource.

In some embodiments, beam failure is indicated to higher layers if the radio link quality for all corresponding beam failure detection reference signal resources in the beam failure detection reference signal resource set of the active bandwidth part is less than a third quality threshold.

In various embodiments, the candidate beam resource is from a candidate beam resource set of the plurality of candidate beam resource sets corresponding to an active bandwidth part.

In one embodiment, the first bandwidth part is a default bandwidth part, and a user equipment switches to the default bandwidth part if a bandwidth part inactivity timer expires for an active bandwidth part.

In certain embodiments, the first bandwidth part is an initial active downlink bandwidth part.

In one embodiment, an apparatus comprises: a receiver that: receives first information comprising a plurality of reference signal resource sets for a plurality of bandwidth parts, wherein each reference signal resource set of the plurality of reference signal resource sets corresponds to a bandwidth part of the plurality of bandwidth parts; and receives a plurality of spatial quasi-co-location information corresponding to a plurality of reference signal resources of the plurality of reference signal resource sets; and a processor that assesses a radio link quality based on the plurality of spatial quasi-co-location information.

In certain embodiments, each reference signal resource set of the plurality of reference signal resource sets comprises a synchronization signal/physical broadcast channel block, a channel state information reference signal, or some combination thereof.

In some embodiments, the radio link quality is assessed each time period of a plurality of time periods.

In various embodiments, the processor, for a radio link quality assessment of a time period of the plurality of time periods, evaluates measurements over a predefined number of previous time periods with respect to the time period.

In one embodiment, the receiver receives a time window configuration for a time window of radio link monitoring, and the time window of radio link monitoring comprises at least one time period of the plurality of time periods and the time window configuration comprises a time window offset, a time window duration, a time window periodicity, or some combination thereof.

In certain embodiments, the plurality of reference signal resource sets comprises a plurality of radio link monitoring reference signal resource sets.

In some embodiments, the processor indicates, via a physical layer in a user equipment, an out-of-sync indication to higher layers in the user equipment if the radio link quality is below a first quality threshold for all radio link monitoring reference signal resources in a radio link monitoring reference signal resource set of the plurality of radio link monitoring reference signal resource sets for an active bandwidth part of the plurality of bandwidth parts.

In various embodiments, the processor indicates, via a physical layer in a user equipment, an in-sync indication to higher layers in the user equipment if the radio link quality is above a second quality threshold for any radio link monitoring reference signal resource in a radio link monitoring reference signal resource set of the plurality of radio link monitoring reference signal resource sets for an active bandwidth part of the plurality of bandwidth parts.

In one embodiment, the processor counts a number of in-sync instances and a number of out-of-sync instances that occur in the plurality of bandwidth parts, wherein the number of in-sync instances and the number of out-of-sync instances are used for determining a radio link failure.

In certain embodiments: the receiver receives second information comprising a plurality of candidate beam resource sets for the plurality of bandwidth parts, wherein: each candidate beam resource set of the plurality of candidate beam resource sets corresponds to a bandwidth part of the plurality of bandwidth parts; the plurality of reference signal resource sets comprises a plurality of beam failure detection reference signal resource sets; and assessing the radio link quality is based on a beam failure detection reference signal resource set of the plurality of beam failure detection reference signal resources sets corresponding to an active bandwidth part of the plurality of bandwidth parts; and the processor: detects a beam failure based on the radio link quality; selects a new beam in response to detecting the beam failure; selects a candidate beam resource of the plurality of candidate beam resource sets corresponding to the new beam; performs a physical random access channel transmission on a beam failure recovery request random access channel resource associated with the candidate beam resource; and monitors a control resource set for a beam failure recovery response in a first bandwidth part of the plurality of bandwidth parts, wherein the first bandwidth part includes the control resource set for the beam failure recovery response, and the control resource set is associated with the beam failure recovery request random access channel resource associated with the candidate beam resource.

In some embodiments, beam failure is indicated to higher layers if the radio link quality for all corresponding beam failure detection reference signal resources in the beam failure detection reference signal resource set of the active bandwidth part is less than a third quality threshold.

In various embodiments, the candidate beam resource is from a candidate beam resource set of the plurality of candidate beam resource sets corresponding to an active bandwidth part.

In one embodiment, the first bandwidth part is a default bandwidth part, and a user equipment switches to the default bandwidth part if a bandwidth part inactivity timer expires for an active bandwidth part.

In certain embodiments, the first bandwidth part is an initial active downlink bandwidth part.

In one embodiment, a method comprises: transmitting first information comprising a plurality of reference signal resource sets for a plurality of bandwidth parts, wherein each reference signal resource set of the plurality of reference signal resource sets corresponds to a bandwidth part of the plurality of bandwidth parts; and transmitting a plurality of spatial quasi-co-location information corresponding to a plurality of reference signal resources of the plurality of reference signal resource sets, wherein a radio link quality is assessed based on the plurality of spatial quasi-co-location information.

In certain embodiments, each reference signal resource set of the plurality of reference signal resource sets comprises a synchronization signal/physical broadcast channel block, a channel state information reference signal, or some combination thereof.

In some embodiments, the radio link quality is assessed each time period of a plurality of time periods.

In various embodiments, for a radio link quality assessment of a time period of the plurality of time periods, measurements over a predefined number of previous time periods are evaluated with respect to the time period.

In one embodiment, the method further comprises transmitting a time window configuration for a time window of radio link monitoring, wherein the time window of radio link monitoring comprises at least one time period of the plurality of time periods and the time window configuration comprises a time window offset, a time window duration, a time window periodicity, or some combination thereof.

In certain embodiments, the plurality of reference signal resource sets comprises a plurality of radio link monitoring reference signal resource sets.

In some embodiments, the method further comprises: transmitting second information comprising a plurality of candidate beam resource sets for the plurality of bandwidth parts, wherein: each candidate beam resource set of the plurality of candidate beam resource sets corresponds to a bandwidth part of the plurality of bandwidth parts; the plurality of reference signal resource sets comprises a plurality of beam failure detection reference signal resource sets; and the radio link quality is assessed based on a beam failure detection reference signal resource set of the plurality of beam failure detection reference signal resources sets corresponding to an active bandwidth part of the plurality of bandwidth parts; a beam failure is detected based on the radio link quality; a new beam is selected in response to detecting the beam failure; a candidate beam resource of the plurality of candidate beam resource sets corresponding to the new beam is selected; a physical random access channel transmission is performed on a beam failure recovery request random access channel resource associated with the candidate beam resource; and a control resource set for a beam failure recovery response in a first bandwidth part of the plurality of bandwidth parts is monitored, wherein the first bandwidth part includes the control resource set for the beam failure recovery response, and the control resource set is associated with the beam failure recovery request random access channel resource associated with the candidate beam resource.

In various embodiments, the candidate beam resource is from a candidate beam resource set of the plurality of candidate beam resource sets corresponding to an active bandwidth part.

In one embodiment, the first bandwidth part is a default bandwidth part, and a user equipment switches to the default bandwidth part if a bandwidth part inactivity timer expires for an active bandwidth part.

In certain embodiments, the first bandwidth part is an initial active downlink bandwidth part.

In one embodiment, an apparatus comprises: a transmitter that: transmits first information comprising a plurality of reference signal resource sets for a plurality of bandwidth parts, wherein each reference signal resource set of the plurality of reference signal resource sets corresponds to a bandwidth part of the plurality of bandwidth parts; and transmits a plurality of spatial quasi-co-location information corresponding to a plurality of reference signal resources of the plurality of reference signal resource sets, wherein a radio link quality is assessed based on the plurality of spatial quasi-co-location information.

In certain embodiments, each reference signal resource set of the plurality of reference signal resource sets comprises a synchronization signal/physical broadcast channel block, a channel state information reference signal, or some combination thereof.

In some embodiments, the radio link quality is assessed each time period of a plurality of time periods.

In various embodiments, for a radio link quality assessment of a time period of the plurality of time periods, measurements over a predefined number of previous time periods are evaluated with respect to the time period.

In one embodiment, the transmitter transmits a time window configuration for a time window of radio link monitoring, and the time window of radio link monitoring comprises at least one time period of the plurality of time periods and the time window configuration comprises a time window offset, a time window duration, a time window periodicity, or some combination thereof.

In certain embodiments, the plurality of reference signal resource sets comprises a plurality of radio link monitoring reference signal resource sets.

In some embodiments: the transmitter transmits second information comprising a plurality of candidate beam resource sets for the plurality of bandwidth parts, wherein: each candidate beam resource set of the plurality of candidate beam resource sets corresponds to a bandwidth part of the plurality of bandwidth parts; the plurality of reference signal resource sets comprises a plurality of beam failure detection reference signal resource sets; and the radio link quality is assessed based on a beam failure detection reference signal resource set of the plurality of beam failure detection reference signal resources sets corresponding to an active bandwidth part of the plurality of bandwidth parts; a beam failure is detected based on the radio link quality; a new beam is selected in response to detecting the beam failure; a candidate beam resource of the plurality of candidate beam resource sets corresponding to the new beam is selected; a physical random access channel transmission is performed on a beam failure recovery request random access channel resource associated with the candidate beam resource; and a control resource set for a beam failure recovery response in a first bandwidth part of the plurality of bandwidth parts is monitored, wherein the first bandwidth part includes the control resource set for the beam failure recovery response, and the control resource set is associated with the beam failure recovery request random access channel resource associated with the candidate beam resource.

In various embodiments, the candidate beam resource is from a candidate beam resource set of the plurality of candidate beam resource sets corresponding to an active bandwidth part.

In one embodiment, the first bandwidth part is a default bandwidth part, and a user equipment switches to the default bandwidth part if a bandwidth part inactivity timer expires for an active bandwidth part.

In certain embodiments, the first bandwidth part is an initial active downlink bandwidth part.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:
   operating the UE with a plurality of active bandwidth parts;
   maintaining, as part of a radio link failure (RLF) procedure, one in-sync (IS) counter and one out-of-sync (OOS) counter per radio link monitoring (RLM) cell by counting IS and OOS instances for each RLM cell for use in determining a radio link failure, wherein maintaining the one IS counter and the one OOS counter per RLM cell comprises using the one IS counter per RLM to count IS instances across configured bandwidth parts (BWPs) and using the one OOS counter per RLM to count OOS instances across the configured BWPs;
   determining a synchronization status of IS or OOS at a certain time based on at least one radio link monitor resource set for at least one active bandwidth part of the plurality of active bandwidth parts;
   in response to determining that the synchronization status is OOS, indicating the synchronization status as being OOS; and
   in response to determining that the synchronization status is IS, indicating the synchronization status as being IS.

2. The method of claim 1, wherein indicating the synchronization status comprises indicating OOS in response to a radio link quality being less than a threshold value for all radio link monitor resources in the at least one radio link monitor resource set for the at least one active bandwidth part.

3. The method of claim 2, wherein the threshold value comprises $Q_{out}$.

4. The method of claim 1, wherein indicating the synchronization status comprises indicating IS in response to a radio link quality being greater than a threshold value for any radio link monitor resource in the at least one radio link monitor resource set for the at least one active bandwidth part.

5. The method of claim 4, wherein the threshold value comprises $Q_{in}$.

6. The method of claim 1, wherein indicating the synchronization status comprises indicating the synchronization status to higher layers.

7. The method of claim 1, wherein indicating the synchronization status comprises a physical layer indicating the synchronization status.

8. The method of claim 1, further comprising transmitting information indicating a link quality degradation in response to different serving beams being used in different configured bandwidth parts, different serving beams being configured in different configured bandwidth parts, or a combination thereof and the link quality of the at least one active bandwidth part degrading.

9. The method of claim 8, wherein indicating the link quality degradation comprises indicating the link quality degradation using a periodic layer 1 reference signal received power report.

10. The method of claim 8, wherein indicating the link quality degradation comprises indicating the link quality degradation using a triggered layer 1 reference signal received power report.

11. The method of claim 8, further comprising receiving a command to switch to a different bandwidth part configured with different serving beams in response to indicating the link quality degradation.

12. An apparatus comprising a user equipment (UE), wherein the apparatus further comprises:
   a processor that:
      operates the UE with a plurality of active bandwidth parts;
      maintains, as part of a radio link failure (RLF) procedure, one in-sync (IS) counter and one out-of-sync (OOS) counter per radio link monitoring (RLM) cell by counting IS and OOS instances for each RLM cell for use in determining a radio link failure, wherein maintaining the one IS counter and the one OOS counter per RLM cell comprises using the one IS counter per RLM to count IS instances across configured bandwidth parts (BWPs) and using the one OOS counter per RLM to count OOS instances across the configured BWPs;
      determines a synchronization status of IS or OOS at a certain time based on at least one radio link monitor resource set for at least one active bandwidth part of the plurality of active bandwidth parts;
      in response to determining that the synchronization status is OOS, indicates the synchronization status as being OOS; and
      in response to determining that the synchronization status is IS, indicates the synchronization status as being IS.

13. The apparatus of claim 12, further comprising a transmitter that transmits information indicating a link quality degradation in response to different serving beams being used in different configured bandwidth parts, different serving beams being configured in different configured bandwidth parts, or a combination thereof and the link quality of the at least one active bandwidth part degrading.

14. The apparatus of claim 13, wherein indicating the link quality degradation comprises indicating the link quality degradation using a periodic layer 1 reference signal received power report.

15. The apparatus of claim 13, wherein indicating the link quality degradation comprises indicating the link quality degradation using a triggered layer 1 reference signal received power report.

16. The apparatus of claim 13, further comprising receiving a command to switch to a different bandwidth part configured with different serving beams in response to indicating the link quality degradation.

* * * * *